Dec. 24, 1968
D. F. RUTLAND ET AL
3,417,492
THREE-DIMENSIONAL WIRE PLOTTER
Filed May 26, 1966
2 Sheets-Sheet 2
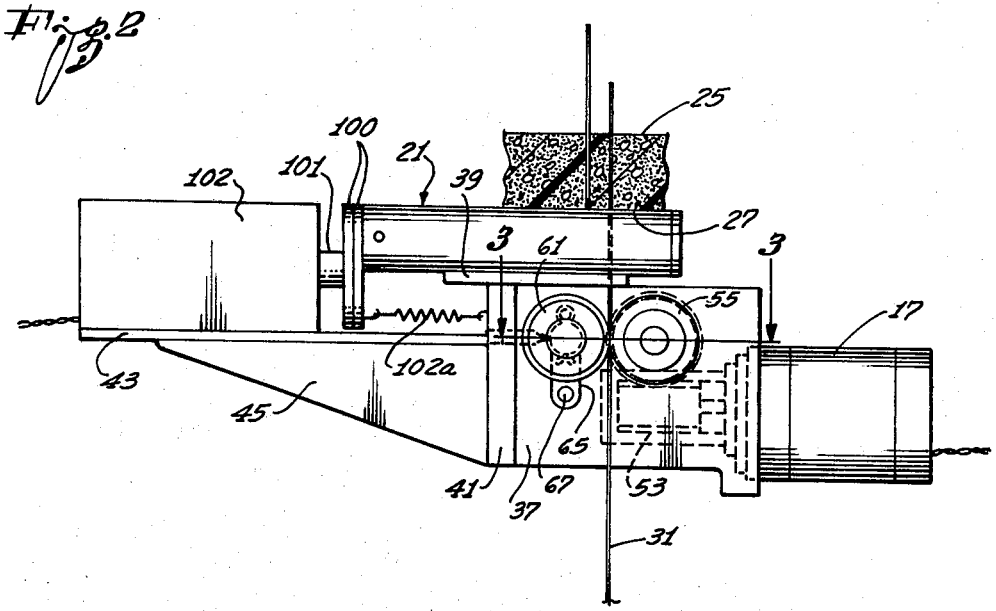
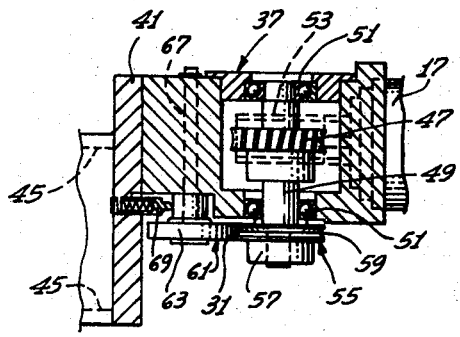
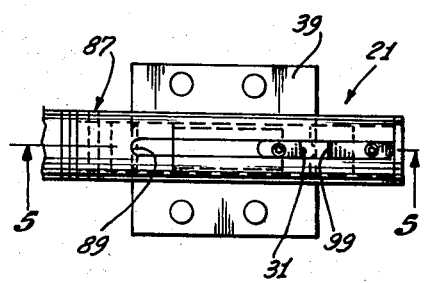
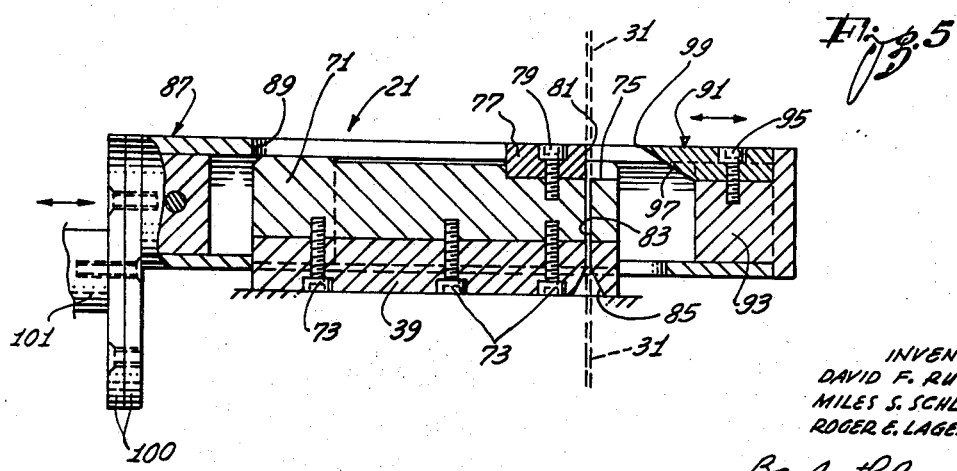
INVENTORS:
DAVID F. RUTLAND
MILES S. SCHLOSSER
ROGER E. LAGERQUIST
ATTORNEYS

United States Patent Office 3,417,492
Patented Dec. 24, 1968

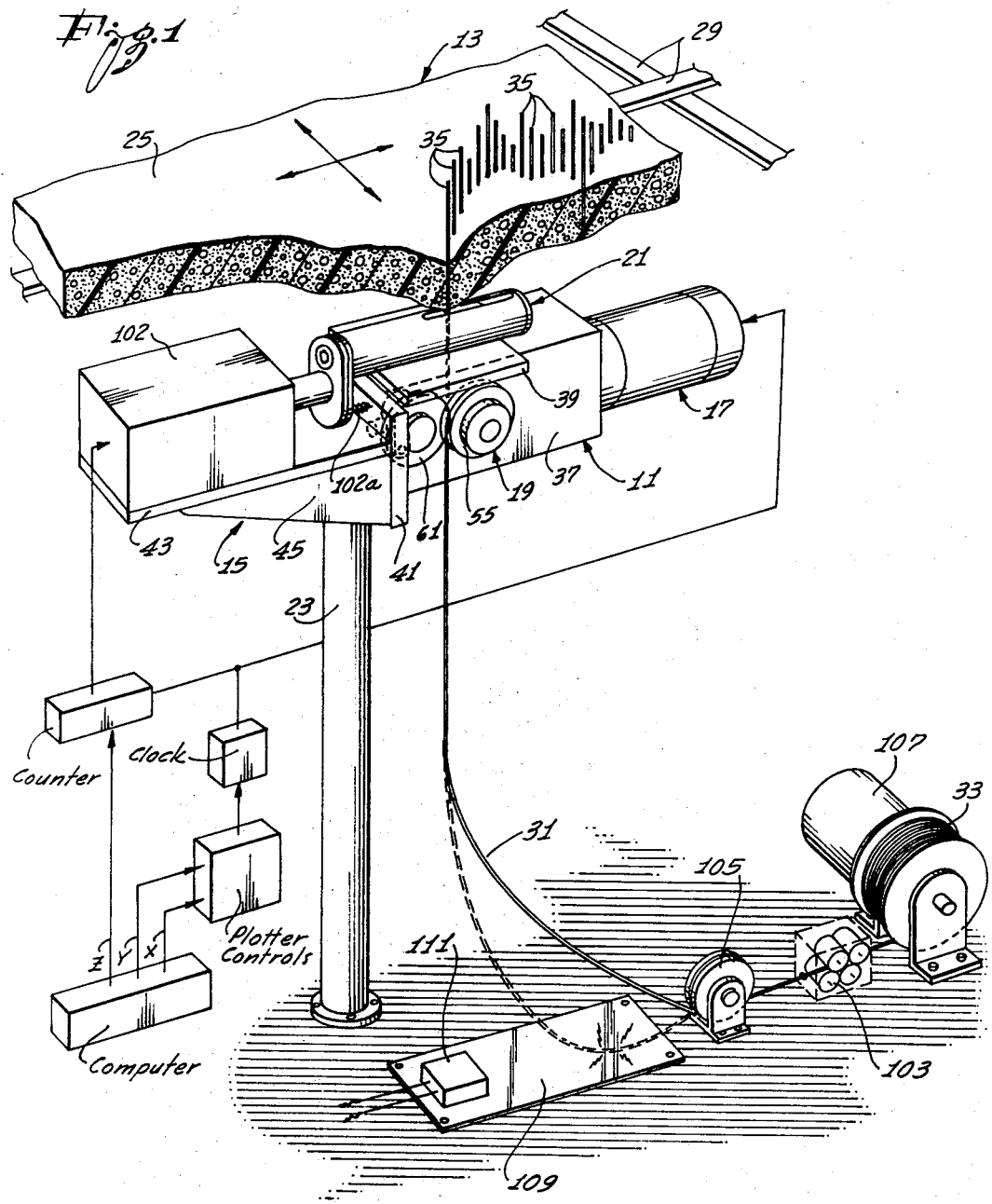

---

3,417,492
THREE-DIMENSIONAL WIRE PLOTTER
David F. Rutland, Santa Barbara, and Miles S. Schlosser and Roger E. Lagerquist, Goleta, Calif., assignors to Spatial Data Systems, Inc., Goleta, Calif., a corporation of California
Filed May 26, 1966, Ser. No. 553,145
9 Claims. (Cl. 35—24)

---

ABSTRACT OF THE DISCLOSURE

This disclosure describes a three-dimensional plotting device which includes wire feeding means for inserting wire from an elongated continuous supply of wire into a plotting board and means responsive to a first input from a data source for relatively positioning the plotting board and the wire feeding means so that the wire feeding means can insert wire into the plotting board at a determined location thereon. The wire feeding means includes means responsive to a second input from the data source for inserting wire into the plotting board at the predetermined location. Cutting means are provided for severing the wire from the supply of wire leaving a predetermined length of wire protruding from one face of the plotting board with such predetermined length of wire graphically corresponding to the second input.

---

This invention relates to an apparatus and method for forming three-dimensional representations on a board and more particularly to an apparatus and method for making a three-dimensional graph.

As is well known, three-dimensional graphs have X, Y, and Z axes. In using a plotting board the X and Y coordinates define the location of a point on the graph along the board surface and the Z coordinate is represented by the elevation of such point from the board surface. These graphs for plotting three variables have utility in recording various information, including information which is stored in computers.

It is difficult to construct three-dimensional graphs rapidly and accurately. Manual plotting of a point for a three-dimensional graph involves accurately locating the X-Y coordinates for the point on the board surface, accurately manually measuring a rod or other member so that the length thereof will represent the Z distance, and attaching such measured rod to the board precisely at the point dictated by the X and Y coordinates. This tedious process must be repeated for each of the many points of the graph. When the information to be plotted is stored in a computer, it is even more difficult to rapidly manually construct the graph.

It is often necessary to construct many permanent graphs, each of which graphically portrays different information. Of course, it is desirable that this be accomplished inexpensively and quickly. Prior art three-dimensional graphs which utilize a plurality of pegs projecting variable distances from the face of the plotting board are relatively expensive and cannot be quickly and automatically adjusted.

Another type of prior art plotting device utilizes a plurality of lead screws, with each of the lead screws having a threaded nut mounted thereon for movement along the screw. The position of each movable nut on its respective lead screw represents certain information, and the positions of the nuts when taken together define points representing a statistical curve. This device is relatively complex and expensive and has no capability for plotting a three-variable curve.

According to the present invention, three-dimensional graphs can be plotted automatically and very rapidly. More particularly, the plotting device of this invention may be directly interconnected to a data source, such as a computer, receive information directly from the computer, and in response thereto form a three-dimensional graphic representation of such information. The plotting device of this invention operates entirely automatically and can rapidly and inexpensively produce very accurate three-dimensional graphs, each of which may represent different data.

The method of this invention includes automatically inserting wire from a wire supply into a plotting board in response to information received from a data source with at least a portion of the wire projecting from a face of the plotting board, and automatically separating the wire to leave a first length of wire projecting from the face of the plotting board. The position of the wire on the board surface represents the X and Y input data. The length of the wire which projects from the face of the plotting board graphically represents the Z input data received from the data source. The outer end of the length of wire projecting from the board represents one point of a curve. By repeating the above-described steps of inserting and separating, many points may be plotted on the board and the curve may be completed. In each instance, the Z input data received from the data source controls the length of the projecting wire. The lateral spacing and positioning between adjacent lengths of wire in the board are also appropriately controlled by the X and Y input data received from the data source.

More particularly, the method of this invention invention includes feeding the wire into the plotting board from the rear face thereof toward and through the front face thereof so that the wire projects from the front face. In this instance, the plotting board is constructed of a wire permeable material, such as a foam plastic material, and the wire is preferably sufficiently rigid to pass through the foam plastic without bending thereof.

It is preferred to sever the wire so that it is flush with the rear face of the plotting board. This allows relative movement of the plotting board and the plotting device without interference from the inserted wire. It also prevents unnecessary scratching or damaging of the walls of an office or of other objects that may come in contact with the rear face of the board. It is also preferred to insert the appropriate length of wire into the plotting board and then perform the cutting operation. With this sequence of operation, the cutting apparatus need not be displaced vertically relative to the board. The term "wire" as used herein may include an elongated element of metal, plastic or other suitable material.

Briefly stated, the three-dimensional plotting device of this invention includes wire feed means for automatically inserting a section of wire from a wire supply into the plotting board and cutting means for automatically severing such section of wire from the wire supply. The wire feed means may be caused to operate automatically in response to information received from a data source. The length of the section of wire expelled by the wire feed means graphically represents the information received from the data source.

To allow many points to be plotted, it is necessary that the wire feed means or head be laterally displaceable relative to the plotting board. Preferably, the head is automatically laterally positioned relative to the plotting board in response to X–Y data which is received from a source of data. Any suitable conventional arrangement of controls or servo motors may be utilized for such lateral positioning. The lateral positioning of the head and board can be accomplished by moving either or both of the head and board.

To control the length of wire which is inserted into the plotting board, the wire feed means includes a stepping motor which allows the wire feed means to deliver wire in .020 increments. The stepping motor is controlled by the Z axis input data which is fed directly from the computer to a counter. When the head has been appropriately positioned in the X–Y direction, clock pulses are automatically fed to the stepping motor and to the counter. The clock pulses are subtracted from the Z data number inserted by the computer and when the counter reads "0," the stepping motor has driven the wire the proper number of steps or increments into the plotting board.

After the wire has been inserted into the board, the cutting means is actuated by the counter to sever the wire flush with the rear face of the plotting board. The cutting means preferably includes a wire cutting member which is movable by a solenoid to sever the wire.

More particularly, the head includes a supporting structure, a drive wheel rotatably mounted on the supporting structure and having a peripheral wire receiving groove therein, and an idler wheel having a peripheral surface engageable with the wire and confronting the groove. The idler wheel is urged toward the groove by a spring to tightly clamp the wire in the groove to assure that the wire will not slip relative to the drive wheel. The stepping motor is drivingly interconnected to the drive wheel. Thus, the stepping motor controls the amount of rotation of the drive wheel and hence the length of wire which is metered into the board.

The wire is forced by the drive wheel through a wire guide, the outlet of which is closely adjacent the rear surface of the plotting board. A stationary cutting member or anvil is secured to the wire guide adjacent the outlet thereof and forms an extension thereof. The wire guide assures that the wire will enter the rear face of the board in straight line fashion at the prescribed location. The movable cutting member is substantially flush with the rear face of the board and is movable by the solenoid toward the stationary cutting member to sever the wire flush with the rear face of the board.

It is apparent that if the wire were to slip relative to the drive wheel, that the head would not provide an accurate control over the amount of wire inserted into the board. As a further safeguard against such slippage, the wire upstream from the head should contain some slack, so that the head only needs to overcome the weight and inertia of the wire. That is, the head should not be required to provide the force for unwinding the wire from a spool or other wire source. Thus, it is often desirable to provide an additional motor drivingly connected to the spool of wire which will slowly unwind the wire from the spool.

It is also important that only a single thread of wire be fed into the head. If too much slack is provided in the length of wire intermediate the head and the spool, the wire may form knots or otherwise entangle to prevent proper operation of the head. To prevent this, a conductive plate may be mounted beneath the head, so that if too much slack exists in the wire, the wire will come in contact therewith. Such contact results in stopping of the spool motor until some of the slack wire has been used up, at which time contact between the wire and plate is broken and the motor is automatically energized. If desired, the conductive plate may also be connected in an alarm circuit which is responsive to such contact to produce a signal advising the operator of this condition.

To further guard against tangling of the wire, the spool on which the wire is stored should be of sufficiently wide diameter to avoid permanent deformation of the wire. In addition, the wire may be run through straightening rolls after leaving the spool.

The invention, both as to its organization and method of operation, together with further features and advantages thereof, may best be understood by reference to the following description taken in connection with the accompanying drawings in which:

FIG. 1 is a perspective view of a three-dimensional plotting system constructed in accordance with the teachings of this invention with some of the controls being shown diagrammatically;

FIG. 2 is a side elevational view of the wire feed apparatus;

FIG. 3 is a fragmentary sectional view taken along line 3–3 of FIG. 2 and illustrating the details of the wire feed mechanism;

FIG. 4 is a fragmentary plan view of the wire cutting apparatus; and

FIG. 5 is an enlarged fragmentary sectional view taken along line 5–5 of FIG. 4.

Referring to the drawings, and in particular to FIG. 1 thereof, a suitable source of data, such as a computer or card reader, is illustrated as having X, Y, and Z input data stored therein. The X and Y input data are fed to the plotter controls and servo motors which laterally position a plotting device or head 11 relative to a plotting board 13 in any suitable conventional manner. The Z input data from the data source is fed to a counter and is stored there as a number. When the plotting device 11 is laterally positioned relative to the board 13, clock pulses are transmitted from the clock to a stepping motor 17 and to the counter. The clock pulses thus initiate operation of the stepping motor 17, which drives a wire feed apparatus 19 to force the wire upwardly into the board 13. These pulses are also subtracted from the Z number input in the counter, and when the counter reads "0," the stepping motor 17 has driven the wire the proper number of steps into the board 13. The counter then stops the stepping motor 17 and actuates a wire cutter 21 which severs the wire at the rear face of the board 13.

With further reference to FIG. 1, it can be seen that the plotting device or head 11 includes a supporting structure 15, a stepping motor 17, a wire feed mechanism 19, and a wire cutter 21. The plotting device 11 is mounted on a post 23.

The plotting board 13 has a front face 25 and a rear face 27 which is preferably contiguous to the upper surface of the wire cutter 21 (FIG. 2). The plotting board 13 is mounted adjacent its periphery by a plurality of suitably supported members 29 to thereby leave the rear face 27 substantially exposed.

The post 23 of the plotting device 11 may be secured to a movable carriage which is moved and controlled by the plotter controls and servo motors illustrated in FIG. 1. This provides for positioning of the plotting device 11 relative to the board 13 in the X and Y directions.

The plotting device 11 draws wire 31 from a spool 33 and forces the wire into the board 13 from the rear face 27 toward and through the front face 25 to provide a plurality of projections 35. The arrangement and lengths of the projections 35 form a three-dimensional graph which graphically portrays the X, Y, and Z input data stored in the computer.

The supporting structure 15 includes a gear reduction housing 37, a cutter supporting plate 39 suitably secured to the upper end of the gear reduction housing 37, a vertical support plate 41 also suitably secured to the gear reduction housing 37, a generally horizontal solenoid support plate 43 suitably secured to the plate 41, and a pair of triangular brackets 45 (FIGS. 1–3). The stepping motor 17 is mounted to one side of the gear reduction housing 37. A worm wheel 47 is mounted on a shaft 49 within the housing 37 (FIG. 3). The shaft 49 is rotatably mounted on a pair of bearings 51 which in turn are mounted in the walls of the housing 37. A worm gear 53 in the housing 37 is driven by the stepping motor 17 and meshes with the worm wheel 47. Thus, the worm gear 53 and the worm wheel 47 serve as a gear reduction unit for the stepping motor 17.

A drive wheel 55 having a hub 57 integral therewith is suitably secured as by set screws (not shown) to a portion of the shaft 49 which extends to the exterior of the housing 37. The drive wheel 55 has a generally V-shaped peripheral groove 59 (FIG. 3) extending completely therearound. By way of illustration, the included angle formed by the groove may be approximately 60 degrees. The groove 59 is appropriately dimensioned to receive the wire 31 in driving relationship.

A follower or idler wheel 61 is provided to maintain the wire 31 in driving relationship with the drive wheel 55. The idler wheel 61 has a cylindrical peripheral surface 63 that is engageable with the wire 31. The idler wheel 61 is suitably rotatably mounted at the upper end of a link 65, the lower end of which is mounted for rotation with an idler shaft 67. As best seen in FIG. 3, the idler shaft 67 is pivotally mounted in one of the walls of the gear reduction housing 37. The idler wheel is biased into engagement with the wire 31 by a spring-biased plunger mechanism 69 which is mounted in the vertical supporting plate 41. Thus, the wheels 55 and 61 form the primary components of the wire feed mechanism 19.

The details of the cutter 21 are illustrated in FIGS. 4 and 5. The cutter 21 includes a block 71 secured to the cutter supporting plate 39 by a plurality of screws 73. The block 71 has a recess 75 formed at one end thereof. A stationary cutting member or anvil 77 lies in the recess 75 and is secured to the block 71 by a screw 79. Preferably, the anvil 77 has a convex cutting surface 81, which is engageable with the wire 31.

A small diameter passageway 83 extends through the cutter supporting plate 39 and the block 71 to form wire guide means. The cutting surface 81 of the anvil 77 lies along one edge of the passageway 83 and extends upwardly therefrom to form an extension of the wire guide means. The lower end of the passageway 83 has a conically flared portion 85 to facilitate threading of the wire through the passageway.

An elongated tubular member 87 is slidably mounted on the block 71 for reciprocation relative thereto. The tubular member 87 has an elongated slot 89 in the upper wall thereof into which the anvil 77 projects. A movable cutting member or blade 91 is secured to a block portion 93 of the tubular member 87 by a countersunk screw 95. The blade 91 has a tapered portion 95, which terminates in a cutting edge 99.

The cutter 21 also includes a pair of plates 100 secured to the tubular member 87 and an operating shaft 101 rigidly attached to the plates 100. The operating shaft 101 is movable longitudinally by a solenoid 102, which is secured to the supporting plate 43. When the solenoid 102 is energized, the operating shaft 101 is retracted to move the blade 91 toward the anvil 77 to sever the wire 31. A spring 102a is connected between one of the plates 100 and the vertical plate 41 to return the tubular member 87 and the blade 91 to the position shown in FIG. 2.

It is significant that the uppermost surfaces of the tubular member 87, the anvil 77, the blade 91, and the screws 79 and 95 are aligned to form a smooth linear surface. This permits the cutter 21 to be mounted closely adjacent or contiguous the rear face 27 of the board 13. It is also significant that the cutting edge 99 is flush with the uppermost surfaces of the tubular member 87, the anvil 77, and the blade 91. This feature of the invention permits the wire 31 to be severed substantially flush with the rear face 27 of the board 13. Thus, no portion of the wire will project downwardly from the rear face 27 to interfere with movement of the plotting device 11 or to scratch or otherwise damage a surface which may come in contact therewith.

It is essential to the construction of an accurate graph that the wire 31 be inserted at the selected location along the surface of the board 13. Accordingly, the wire guide or passageway 83 is provided to direct the wire against the selected point on the rear face 27 of the board 13.

Although the wire feeds mechanism 19 could meter and supply various kinds and forms of materials to the plotting board 13, it is particularly adapted for use with the wire 31. It is preferred to utilize wire of small diameter, e.g., .020 inch in diameter.

As shown in FIG. 1, the wire 31 is wound on the spool 33 and extends from the spool through straightening rollers 103 and around a pulley 105 to the wire feed mechanism 19. If desired, to minimize the load on the stepping motor 17 and the wire feed mechanism 19, a motor 107 may be drivingly connected to the spool 33 to unwind the wire therefrom and to at least assist in forcing the wire 31 through the straightening rollers 103.

To prevent tangling of the wire 31, it is desired that the slack therein not exceed a predetermined amount. Accordingly, signal means is provided, which emits a signal if the slack in the wire exceeds a predetermined amount. One such signal arrangement is illustrated in FIG. 1 and includes a conductive plate 109 appropriately mounted beneath the wire 31. If the slack in the wire 31 becomes too great, it will contact the conductive plate 109 as illustrated in phantom in FIG. 1. A suitable signaling apparatus 111 is responsive to such contact of the wire 31 and the plate 109 to provide a signal such as the ringing of a bell or the turning on of a light. The signaling apparatus 111 may detect the contact of the wire 31 and the plate 109 in any suitable manner. For example, the plate 109 and the wire 31 may provide a connection from the signaling apparatus 111 to ground. In addition to emitting a signal, or in lieu thereof, the signaling apparatus 111 may function to automatically stop the motor 107 in response to contact of the wire and the plate 109 to allow the excess slack in the wire 31 to be utilized by the wire feed mechanism and to start the motor 109 when such contact is broken.

The operation of the device is as follows. First, X and Y input data are fed from the computer to the plotter controls, which function to position the plotting device 11 laterally with respect to the plotting board 13. The rear face 27 of the plotting board is closely adjacent or contiguous the uppermost surfaces of the tubular member 87, the anvil 77, and the blade 91. Z input data is fed directly from the computer to the counter and after the plotting device 11 has been laterally positioned, the clock feeds pulses to the stepping motor 17 to energize the latter. These pulses are also fed to the counter where they are subtracted from the Z input data or number which has been fed thereto by the computer. When the counter reads "0," the stepping motor 17 has driven the wire the proper number of steps into the plotting board 13 and the stepping motor is turnned off automatically. As it is the length of the projection 35 that represents the Z input data, the counter must be automatically advanced by the computer to account for the thickness of the board 13.

More particularly, prior to the time the stepping motor 17 has been energized, the wire 31 is held in the peripheral groove 59 by the idler wheel 61, which is biased toward the wire by the plunger mechanism 69. The wire 31 extends upwardly from the groove 59 and passes through the passageway 83 and terminates flush with the upper surface of the anvil 77. The movable cutting member 91 is spaced from the anvil 77 as illustrated in FIG. 5.

When the stepping motor 17 is energized, it begins to rotate the drive wheel 55 through the worm gear 53 and the worm wheel 47. Because the wire 31 is biased into the groove 59, rotation of the drive wheel 55 imparts a corresponding amount of linear movement to the wire 31. Likewise, the idler wheel 63 rotates with the drive wheel 55. The stepping motor 17 moves periodically or in steps and preferably imparts .020 inch incremental movements to the wire 31. This means that the length of wire metered by the wire feed mechanism 19 can be controlled to within .020 inch of the desired length.

The wire feed mechanism 19 drives the wire into the plotting board 13 from the rear face 27 toward and through the front face 25. The wire 31 is sufficiently straight and rigid to be forced through the wire permeable plotting board 13 without bending. Incremental movements of the motor 17 continues until the counter reads "0," at which time the stepping motor is automatically stopped. At this point the length of the projection 35 above the front face 25 of the board 13 is of the proper length to graphically represent the Z input data from the computer.

Simultaneously, with the stopping of the stepping motor 17, the counter energizes the solenoid 102. The solenoid retracts the operating shaft 101, thereby causing movement of the tubular member 87 and of the blade 91 toward the anvil 77 to sever the wire 31 flush with the rear face 27 of the plotting board 13. The spring 102a returns the blade 91 to the position illustrated in FIG. 5, in which the cutting edge 99 is spaced from the cutting surface 81 of the anvil 77.

The operation described above is rapidly performed by the apparatus described herein. When the wire 31 has been severed, additional X, Y, and Z input data are fed to the plotter controls and the counter to cause the above-described operation to be repeated.

For many graphs, it may be desirable to utilize about twenty-five of the projections 35 per linear inch of the front face 25. With the device of the present invention, this can be accomplished rapidly and accurately and the data may be taken directly from the computer or other data source. Of course, the length of the projections 35 will vary depending upon the input data which is graphically represented by each of the projections. In the particular embodiment illustrated, a three-dimensional graph having a plurality of parallel projections 35 which are generally perpendicular to the front face 25 are formed. However, the apparatus of this invention can be used to graphically portray information in various other manners.

Although an illustrative embodiment of the present invention has been shown and described, it should be understood that various changes, modifications, and substitutions may be made by one having ordinary skill in the art without necessarily departing from the spirit and scope of this invention.

What is claimed is:

1. In a three-dimensional plotter for automatically plotting a three-dimensional graph on a plotting board in response to input data from the data source, the combination of:
   wire feed means responsive to the input data for automatically inserting a section of wire, the length of which graphically represents the input data, from a wire supply into the board;
   cutting means for automatically severing the section of wire from the wire supply; and
   said wire feed means including a stepping motor for metering the wire into the board, said plotter also including means for supplying energizing pulses to said stepping motor and counter means responsive to the input data for controlling the number of said energizing pulses fed to the stepping motor.

2. In a three-dimensional plotter for automatically plotting a three-dimensional graph on a plotting board in response to first and second inputs from a data source, the combination of:
   a head including wire feeding means for inserting wire from an elongated continuous supply of wire into the plotting board and cutting means for severing a length of wire from the supply of wire;
   means responsive to the first input for relatively positioning the plotting board and the wire feeding means so that the wire feeding means can insert wire into the plotting board at a predetermined location thereon with said location graphically representing the first input; and
   said wire feeding means including means responsive to the second input for inserting wire into the plotting board at said predetermined location and said cutting means being operative to sever the wire following insertion thereof into the plotting board to leave a predetermined length of wire protruding from one face of the plotting board with said predetermined length of wire graphically corresponding to the second input.

3. A combination as defined in claim 2 wherein said first mentioned means positions said head and said cutter means severs the wire without moving axially of the wire in the plotting board relative to said wire feeding means.

4. A combination as defined in claim 2 including a spool for the supply of wire and motor means for driving said spool to unwind at least a portion of the supply of wire therefrom to provide slack in the wire intermediate said spool and said wire feeding means.

5. A combination as defined in claim 4 including means providing a signal in response to a predetermined slack in the wire intermediate said spool and said wire feeding means.

6. In a three-dimensional plotter for automatically plotting a three dimensional graph on a plotting board having first and second faces in response to first and second inputs from a data source, the combination of:
   wire feed means for supplying wire from an elongated continuous length of wire to the plotting board;
   means responsive to the first input for relatively positioning said wire feed means and the plotting board to permit said wire feed means to insert wire into the plotting board at a predetermined location which graphically corresponds to the first input;
   operator means responsive to the second input for automatically causing the wire feed means to insert the wire into the first face of the plotting board and through the plotting board until a predetermined length of the wire extends from the second face of the plotting board with said predetermined length of wire graphically corresponding to said second input; and
   cutter means for severing the wire inserted into the plotting board from the continuous length of wire to leave said predetermined length of wire projecting from the second face of the plotting board.

7. A combination as defined in claim 6 wherein said cutter means is located substantially flush with said first face of the plotting board and severs the wire from the elongated continuous length of wire substantially flush with said first face.

8. In a three-dimensional plotter for automatically plotting a three-dimensional graph on a plotting board having first and second faces in response to first and second inputs from a data source, the combination of:
   a head including wire feed means for supplying wire from an elongated continuous length of wire to the plotting board and cutter means for severing the wire inserted into the plotting board from the wire supply;
   means responsive to the first input for relatively positioning said head and the plotting board to permit said wire feed means to insert wire into the plotting board at a predetermined location which graphically corresponds to the first input;

operator means responsive to the second input for automatically causing the wire feed means to insert the wire into the first face of the plotting board and through the plotting board until a predetermined length of the wire extends from the second face of the plotting board with said predetermined length of wire graphically corresponding to said input; and actuating means for actuating said cutter means to sever the wire inserted into the plotting board from the wire supply leaving said predetermined length of wire projecting from said second face of said plotting board.

9. A combination as defined in claim 6 wherein said cutting means includes a wire cutting member and said actuating means includes solenoid means responsive to the wire feeding means discontinuing the insertion of the wire into the board for moving said cutting member to sever the wire.

References Cited
UNITED STATES PATENTS

| | | | |
|---|---|---|---|
| 2,617,095 | 11/1952 | Gondek | 227—80 |
| 3,358,389 | 12/1967 | Roderfer | 35—24 |

RICHARD B. WILKINSON, *Primary Examiner.*

J. W. HARTARY, *Assistant Examiner.*

U.S. Cl. X.R.

140—93; 227—80; 346—29, 146